United States Patent
Shimomura et al.

(10) Patent No.: US 12,512,138 B2
(45) Date of Patent: Dec. 30, 2025

(54) MAGNETIC MEMORY

(71) Applicant: Kioxia Corporation, Tokyo (JP)

(72) Inventors: Naoharu Shimomura, Meguro Tokyo (JP); Tsuyoshi Kondo, Kawasaki Kanagawa (JP); Michael Arnaud Quinsat, Yokohama Kanagawa (JP); Yasuaki Ootera, Yokohama Kanagawa (JP); Masaki Kado, Kamakura Kanagawa (JP); Yoshihiro Ueda, Yokohama Kanagawa (JP); Tsutomu Nakanishi, Yokohama Kanagawa (JP); Nobuyuki Umetsu, Kawasaki Kanagawa (JP); Susumu Hashimoto, Nerima Tokyo (JP); Shiho Nakamura, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 150 days.

(21) Appl. No.: 18/439,612

(22) Filed: Feb. 12, 2024

(65) Prior Publication Data

US 2024/0274176 A1 Aug. 15, 2024

(30) Foreign Application Priority Data

Feb. 13, 2023 (JP) .................. 2023-020341

(51) Int. Cl.
*G11C 11/16* (2006.01)
*H10B 61/00* (2023.01)
(Continued)

(52) U.S. Cl.
CPC ............ *G11C 11/161* (2013.01); *H10B 61/22* (2023.02); *H10N 50/10* (2023.02); *H10N 50/80* (2023.02); *G11C 11/1675* (2013.01)

(58) Field of Classification Search
CPC ... G11C 11/161; G11C 11/1675; H10B 61/22; H10N 50/10; H10N 50/80
(Continued)

(56) References Cited

U.S. PATENT DOCUMENTS

| 8,830,742 B2 | 9/2014 | Kondo et al. |
| 9,293,696 B2 | 3/2016 | Ootera et al. |

(Continued)

FOREIGN PATENT DOCUMENTS

| JP | 5592909 B2 | 9/2014 |
| JP | 2016-009806 A | 1/2016 |

(Continued)

OTHER PUBLICATIONS

H. Honjo et al., " Domain-wall-motion cell with perpendicular anisotropy wire and in-plane magnetic tunneling junctions" J. Appl. Phys. 111, 07C903 (2012); DOI: https://doi.org/10.1063/1.3671437 (4 pages).

*Primary Examiner* — Ly D Pham
(74) *Attorney, Agent, or Firm* — Kim & Stewart LLP

(57) ABSTRACT

A magnetic memory includes a plurality of cylindrical magnetic members each extending along a first direction and having a first end portion and a second end portion; and a magnetoresistive element that includes: a magnetization variable layer with a variable magnetization direction, a magnetization fixed layer with a fixed magnetization direction, and a non-magnetic layer between the magnetization variable layer and the magnetization fixed layer. When viewed in the first direction, the magnetoresistive element overlaps a part of the first end portion of one of the magnetic members. The magnetization direction of the magnetization variable layer intersects with the magnetization direction of the magnetization fixed layer at an angle larger than 0 degrees and smaller than 180 degrees.

20 Claims, 14 Drawing Sheets

(51) Int. Cl.
   *H10N 50/10*         (2023.01)
   *H10N 50/80*         (2023.01)
(58) Field of Classification Search
   USPC .......................................................... 365/158
   See application file for complete search history.

(56)                References Cited

U.S. PATENT DOCUMENTS

| | | | |
|---|---|---|---|
| 2009/0207724 A1* | 8/2009 | Yanagi | G11C 11/1659 |
| | | | 369/283 |
| 2014/0087483 A1* | 3/2014 | Ohsawa | H01J 37/3053 |
| | | | 438/3 |
| 2015/0380638 A1 | 12/2015 | Ootera et al. | |
| 2018/0358104 A1 | 12/2018 | Ootera et al. | |
| 2020/0105325 A1* | 4/2020 | Tzoufras | G11C 11/1675 |
| 2021/0083001 A1 | 3/2021 | Yoshimizu | |
| 2022/0077383 A1 | 3/2022 | Kondo et al. | |
| 2022/0293678 A1 | 9/2022 | Ueda et al. | |
| 2023/0180484 A1* | 6/2023 | Nakamura | G11C 11/161 |
| | | | 257/421 |

FOREIGN PATENT DOCUMENTS

| | | |
|---|---|---|
| JP | 6271350 B2 | 1/2018 |
| JP | 2019-003989 A | 1/2019 |
| JP | 2020-045204 A | 3/2020 |
| JP | 2021-048240 A | 3/2021 |
| JP | 2022-045204 A | 3/2022 |
| JP | 2022-138916 A | 9/2022 |

* cited by examiner

14

MAGNETIC MEMORY

CROSS-REFERENCE TO RELATED APPLICATION

This application is based upon and claims the benefit of priority from Japanese Patent Application No. 2023-020341, filed Feb. 13, 2023, the entire contents of which are incorporated herein by reference.

FIELD

Embodiments described herein relate generally to a magnetic memory.

BACKGROUND

A magnetic memory is known in which a magnetic wall or domain wall of a magnetic member is moved or shifted by a current flowing through the magnetic member. When data is read from such a magnetic member, the magnetoresistive element provided at the end portion of the magnetic member detects the magnetization direction of the magnetic member to change the resistance state, and detects the resistance value of the magnetoresistive element. Therefore, it is preferable that the magnetic field from the magnetic member that is received by the magnetoresistive element is large. However, when the magnetic field of the magnetic member is increased, there is a concern that a read error may occur due to the influence of a magnetic field from the magnetic member positioned in the vicinity.

DETAILED DESCRIPTION

Figure 1:
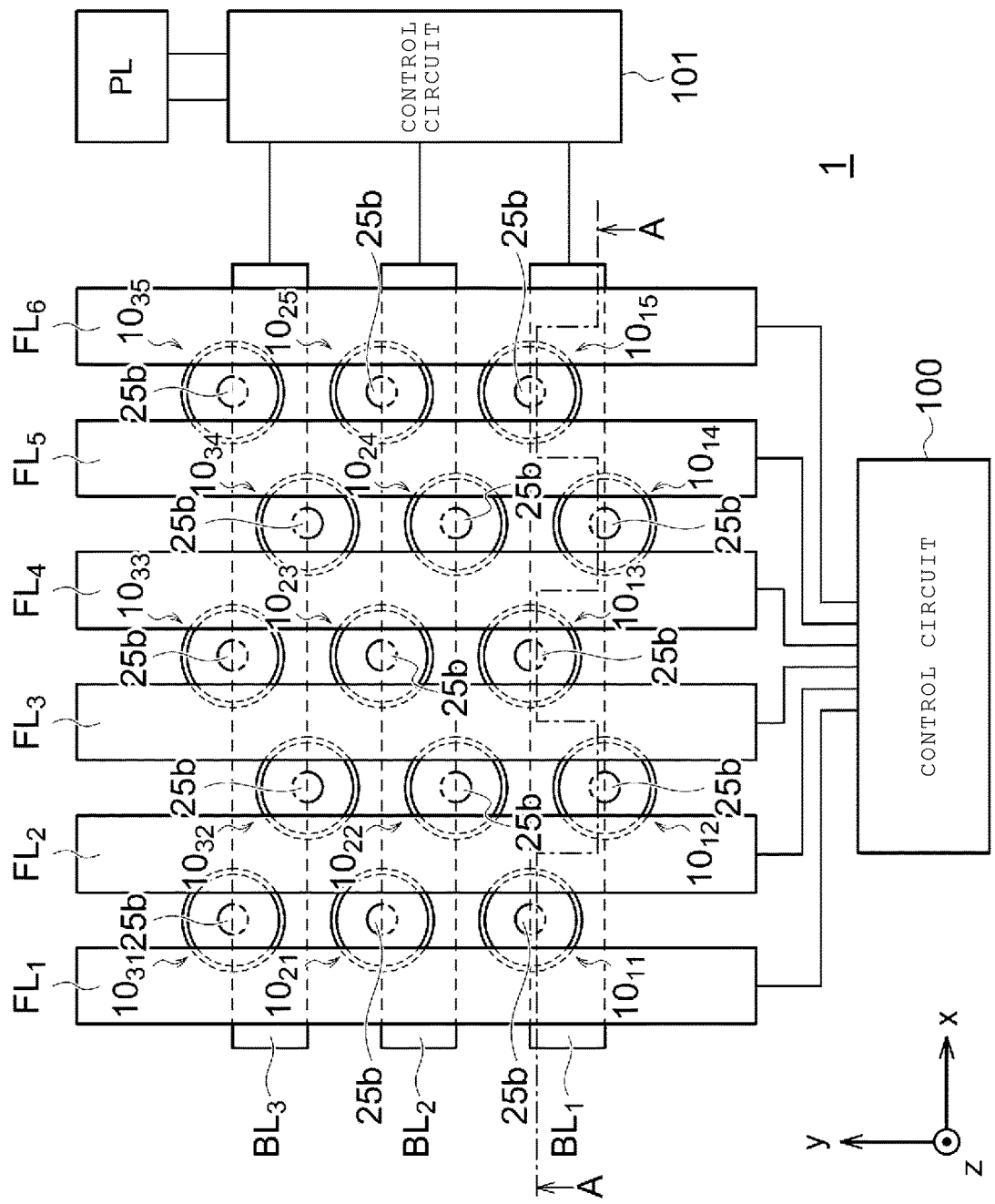
FIG. 1 is a plan view of a magnetic memory according to a first embodiment.

Embodiments provide a magnetic memory in which a magnetoresistive element can efficiently receive a magnetic field from a magnetic member.

In general, according to one embodiment, a magnetic memory includes a plurality of cylindrical magnetic members each extending along a first direction and having a first end portion and a second end portion; and a magnetoresistive element that includes: a magnetization variable layer with a variable magnetization direction, a magnetization fixed layer with a fixed magnetization direction, and a non-magnetic layer between the magnetization variable layer and the magnetization fixed layer. When viewed in the first direction, the magnetoresistive element overlaps a part of the first end portion of one of the magnetic members. The magnetization direction of the magnetization variable layer intersects with the magnetization direction of the magnetization fixed layer at an angle larger than 0 degrees and smaller than 180 degrees.

Hereinafter, embodiments of the present disclosure will be described with reference to the drawings. The embodiments described below do not limit the present disclosure. The drawings are schematic or conceptual. In the specification and drawings, the same elements are denoted by the same reference numerals.

First Embodiment

Figure 2:
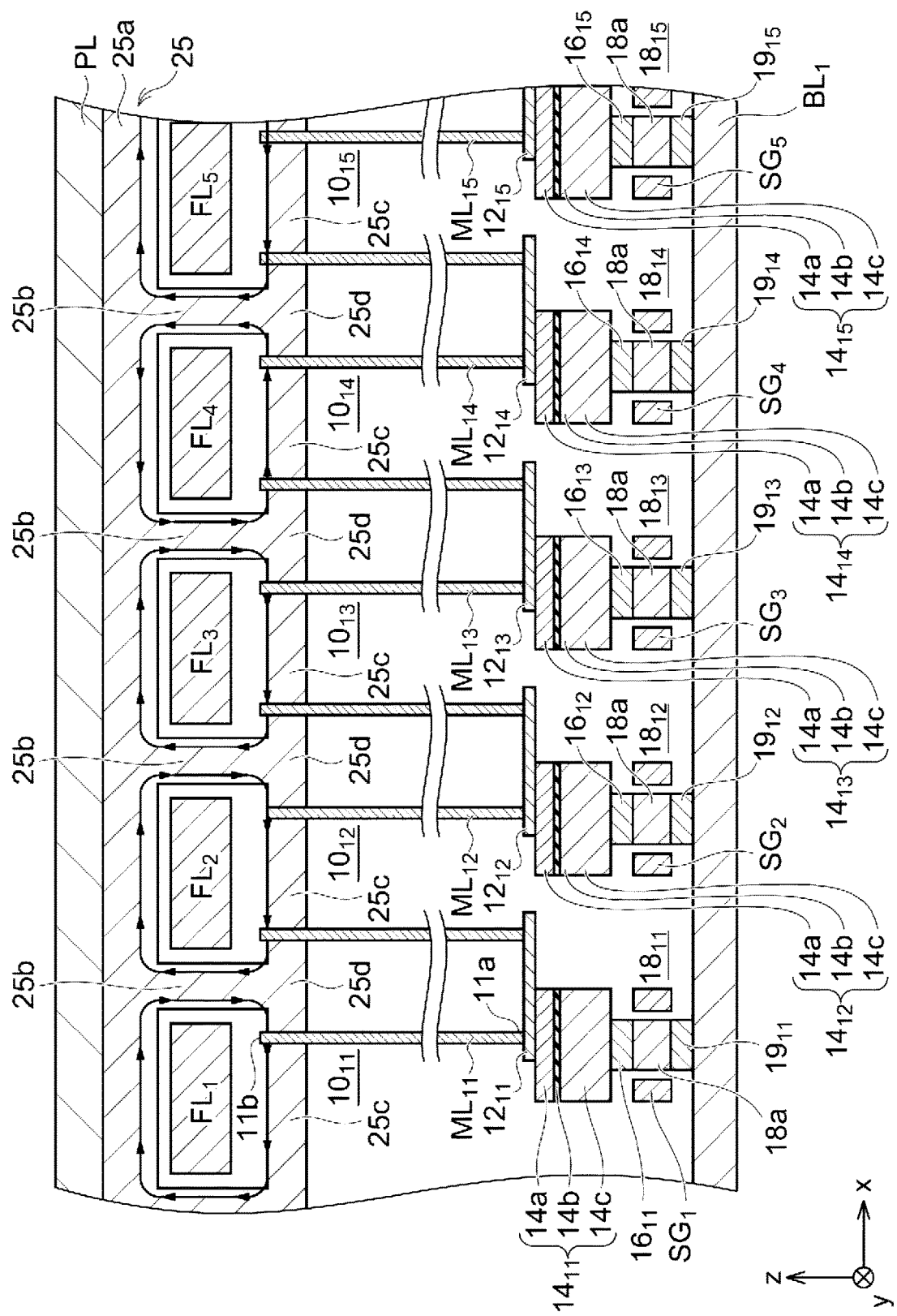
FIG. 2 is a cross-sectional view taken along line A-A shown in FIG. 1.

FIG. 1 is a plan view of a magnetic memory 1 according to a first embodiment. FIG. 2 is a cross-sectional view taken along line A-A shown in FIG. 1. The magnetic memory 1 of the present embodiment includes a plurality of memory units $10_{ij}$ (i=1 to m, j=1 to n) disposed in m rows and n columns when m and n are natural numbers. FIG. 1 shows the memory units $10_{11}$ to $10_{35}$ arranged in 3 rows and 5 columns.

The memory units $10_{i1}$ to $10_{in}$ in the i-th row are each disposed along a bit line $BL_i$ extending in an x direction, and one end thereof is electrically coupled to the bit line $BL_i$. In the present specification, "A and B are electrically coupled" means that A and B may be directly coupled or connected or may be indirectly coupled or connected via a conductor (i.e., electrically connected). In the i-th row, the memory units $10_{i1}$, $10_{i3}$, ... in the odd-numbered columns and the memory units $10_{i2}$, $10_{i4}$, ... in the even-numbered columns are shifted in a vertical direction (i.e., y direction) on a paper surface. For example, the memory units $10_{i2}$ in the even-numbered column are disposed between the memory units $10_{i1}$ and the memory units $10_{i3}$, and shifted towards the lower side on the paper surface. With this arrangement, a plurality of memory units can be densely disposed, and integration can be performed.

Two field lines FLj and FLj+1 are provided with respect to each of the memory units $101j$, ..., and $10mj$ disposed in the j-th column. The field line FLj+1 (j=1, ..., and n−1) is disposed above the area between the memory units $10ij$ in the j-th column and the memory units $10ij+1$ in the j+1-th column. In addition, the field line FLj+1 may overlap a portion of each of the memory units $10ij$ in the j-th column and overlap a portion of each of the memory units $10ij+1$ in the j+1-th column in the z direction.

The field line FLj is provided on the second end portion 11b (see FIG. 3) side of the magnetic members MLij−1 and MLij and is disposed apart from the magnetic members MLij−1 and MLij. The field line FLj extends along the y direction intersecting the z direction and is arranged along the x direction intersecting the z direction and the y direction. In a plan view in the z direction, one magnetic member MLij is positioned between the field lines FLj and FLj+1.

For example, the field line FL2 and the field line FL3 are provided with respect to the memory units 1012 disposed in the second column. The field line FL2 is disposed above the area between the memory units 10i1 of the first column and the memory units 1012 of the second column. In addition, the field line FL2 may overlap a portion of each of the memory units 10i1 in the first column and overlap a portion of each of the memory units 1012 in the second column. Each field line FLj extends along the y direction and intersects each bit line BLi. Each of the field lines FLj is electrically coupled to and controlled by a control circuit 100. The control circuit 100 can selectively cause a current to pass through the field line FLj, and can also cause a current to pass through all the field lines FLj. In addition, each of the bit lines BLi and the plate electrode PL are coupled to a control circuit 101.

As shown in FIG. 2, the yoke 25a is disposed above the memory units 10ij. The yoke 25a is disposed above each of all the field lines FL1 to FLn+1. In addition, the plate electrode PL electrically coupled to the yoke 25a is in contact with the upper surface of the yoke 25a and to cover the upper surface. The yoke 25b is provided between the two adjacent field lines FLj and couples the yoke 25a and the yoke 25d. The yoke 25c is provided under each field line FLj and is provided between the two adjacent magnetic members MLij. The yoke 25d is provided on each of the magnetic members MLij and is electrically coupled to the corresponding magnetic member MLij.

Further, the plate electrode PL is coupled to the control circuit 101. As the material of the yokes 25a, 25b, 25c, and 25d, for example, a conductive soft magnetic body (for example, permalloy) or a material containing a conductive soft magnetic body may be used. In addition, as the material of the yokes 25a, 25b, 25c, and 25d, a material having a granular structure in which magnetic particles are densely dispersed in the insulating matrix may be used. The yoke 25a may also serve as the plate electrode PL.

Each of the memory units $10ij$ includes, as shown in FIG. 2, a magnetic memory line (i.e., magnetic member) MLij made of a conductive magnetic body, a non-magnetic conductive layer $12ij$, a magnetoresistive element $14ij$, a non-magnetic conductive layer $16ij$, a vertical thin film transistor $18ij$, and a non-magnetic conductive layer $19ij$.

Each of the magnetic members MLij includes a vertical magnetic material extending in the vertical direction (i.e., the z direction) in FIG. 2 and has a cylindrical shape. The magnetic members MLij have, for example, a substantially cylindrical shape.

Figure 3:
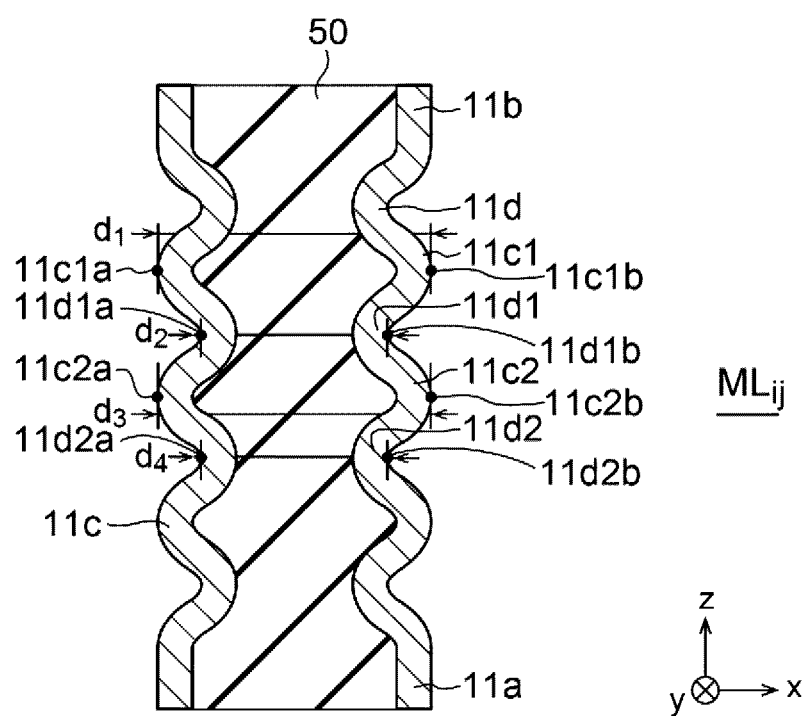
FIG. 3 is a cross-sectional view showing a configuration example of a magnetic member.

FIG. 3 is a cross-sectional view showing a configuration example of a magnetic member. A non-magnetic insulator 50 may be provided in the cylinder of each of the magnetic members MLij, as shown in FIG. 3. That is, each of the magnetic members MLij may surround the non-magnetic insulator 50. Further, in the magnetic member MLij, as shown in FIG. 3, an area 11c1, a hanging portion 11d1, an area 11c2, and a hanging portion 11d2 are disposed along in the z direction. The length or diameter between the end portion 11c1a and the end portion 11c1b of the area 11c1 in the x direction in the cross section of the area 11c1 taken along a plane parallel to the z direction is denoted by d1. The length or diameter between the end portion 11d1a and the end portion 11d1b of the hanging portion 11d1 in the x direction in the cross section of the hanging portion 11d1 taken along a plane parallel to the z direction is denoted by d2. The length or diameter between the end portion 11c2a and the end portion 11c2b of the area 11c2 in the x direction in the cross section of the area 11c2 taken along a plane parallel to the z direction is denoted by d3. The length or diameter between the end portion 11d2a and the end portion 11d2b of the hanging portion 11d2 in the x direction in the cross section of the hanging portion 11d2 taken along a plane parallel to the z direction is denoted by d4. In this case, the following conditions are satisfied.

$$d1 > d2$$
$$d1 > d4$$
$$d3 > d2$$
$$d3 > d4$$

Further, the magnetic member MLij has a first end portion 11a electrically coupled to the magnetoresistive element $14ij$ through the non-magnetic conductive layer $12ij$. The non-magnetic conductive layer $12ij$ may be omitted. In this case, the first end portion 11a of the magnetic member MLij is directly coupled to the magnetoresistive element $14ij$.

Further, each of the magnetic members MLij has a second end portion 11b electrically coupled to the yoke 25d. The yoke 25d and the yoke 25c are magnetically coupled. Here, "A is magnetically coupled to B" means that A and B configure a magnetic circuit, and also includes a case where the magnetic bodies are not directly in contact with each other. The yoke 25c faces the yoke 25a, and the field lines FL1, ..., and FLn+1 are disposed between the yoke 25a and the yoke 25c. The yoke 25d is disposed in the center of the cylinder of each of the magnetic members MLij, is positioned on the same layer as the yoke 25c, and is magnetically coupled to the yoke 25c. The yoke 25b is disposed between the yoke 25a and the yoke 25d and is electrically and magnetically coupled to the yoke 25a and the yoke 25d.

Accordingly, the plate electrode PL is electrically coupled in common to each of the memory units $10ij$.

Figure 4:
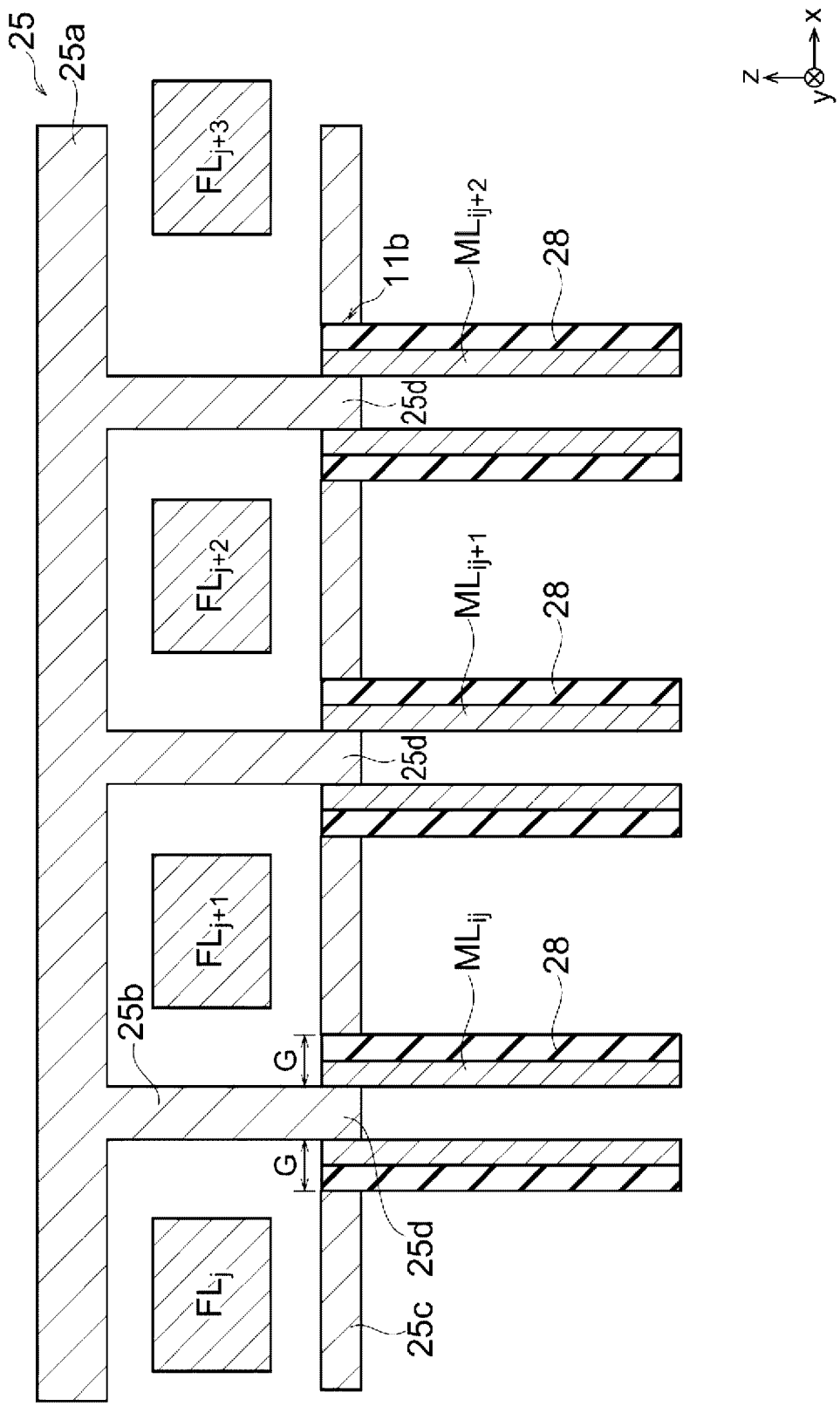
FIG. 4 is a cross-sectional view showing a configuration example of a yoke, a field line, and a magnetic member.

As shown in FIG. 4, the yokes $25a$, $25b$, $25c$, and $25d$ are provided around each of the field lines FL1, ..., and FLn+1, and configure the magnetic circuit 25. As shown in FIG. 4, the yoke $25b$ provided in the first portion faces one side surface of the field line FLj+1, and is electrically coupled to the magnetic member MLij on the one side surface side. The yoke $25b$ faces the side surface on the opposite side of the field line FLj+1, and is electrically coupled to the magnetic member MLij+1 on the side surface side.

A magnetic gap is provided in the magnetic circuit 25. For example, FIG. 4 is a cross-sectional view showing a configuration example of a yoke, a field line, and a magnetic member. The yoke $25b$ has one end coupled to the yoke $25a$ and the other end coupled to the yoke $25d$. The yoke $25d$ is electrically coupled to the inner surface of the upper end portion of the corresponding magnetic member MLij. A non-magnetic insulating layer 28 is disposed on the outer surface of each of the magnetic members MLij, and the yoke $25d$ is magnetically coupled to the yoke $25c$ through the insulating layer 28. That is, the width of a magnetic gap G in the x direction is the sum of the x direction thickness of each of the magnetic members MLij and the x direction thickness of the insulating layer 28.

In addition, the field lines FLj to FLj+3 are provided on the second end portion $11b$ side of each of the magnetic members MLij to MLij+2 and are disposed apart from the magnetic members MLij to MLij+2. The field lines FLj to FLj+3 extend along the y direction and are disposed adjacent to each other in the x direction. In a plan view in the z direction, magnetic members MLij to MLij+2 are positioned one by one between the field lines FLj to FLj+3. Although not shown in FIG. 4, a plate electrode PL is provided on the yoke $25a$. The yokes $25a$ to $25d$ may also have a function as a plate electrode by using a conductive magnetic material.

In a plan view in the z direction, one magnetic member ML is positioned between two field lines FL adjacent to each other among the field lines FLj to FLj+3. The two field lines FL adjacent to each other share the yokes $25a$ and $25b$. The yoke $25a$ is shared by one row of field lines FLj to FLj+3.

In the present embodiment, in the control circuit 100 of FIG. 1, when data is written to the magnetic members MLij to MLij+2, for example, a current can pass to only one of the two left and right field lines FL closest to the magnetic member ML to be written. In other words, the control circuit 100 can write data to the second end portions $11b$ of the two magnetic members ML positioned on both sides of the field line FL in a plan view in the z direction by passing a current through one field line FL. By this writing, a magnetic domain having a magnetization direction corresponding to the written data is formed in the second end portion $11b$ of the magnetic member ML.

Figure 5:
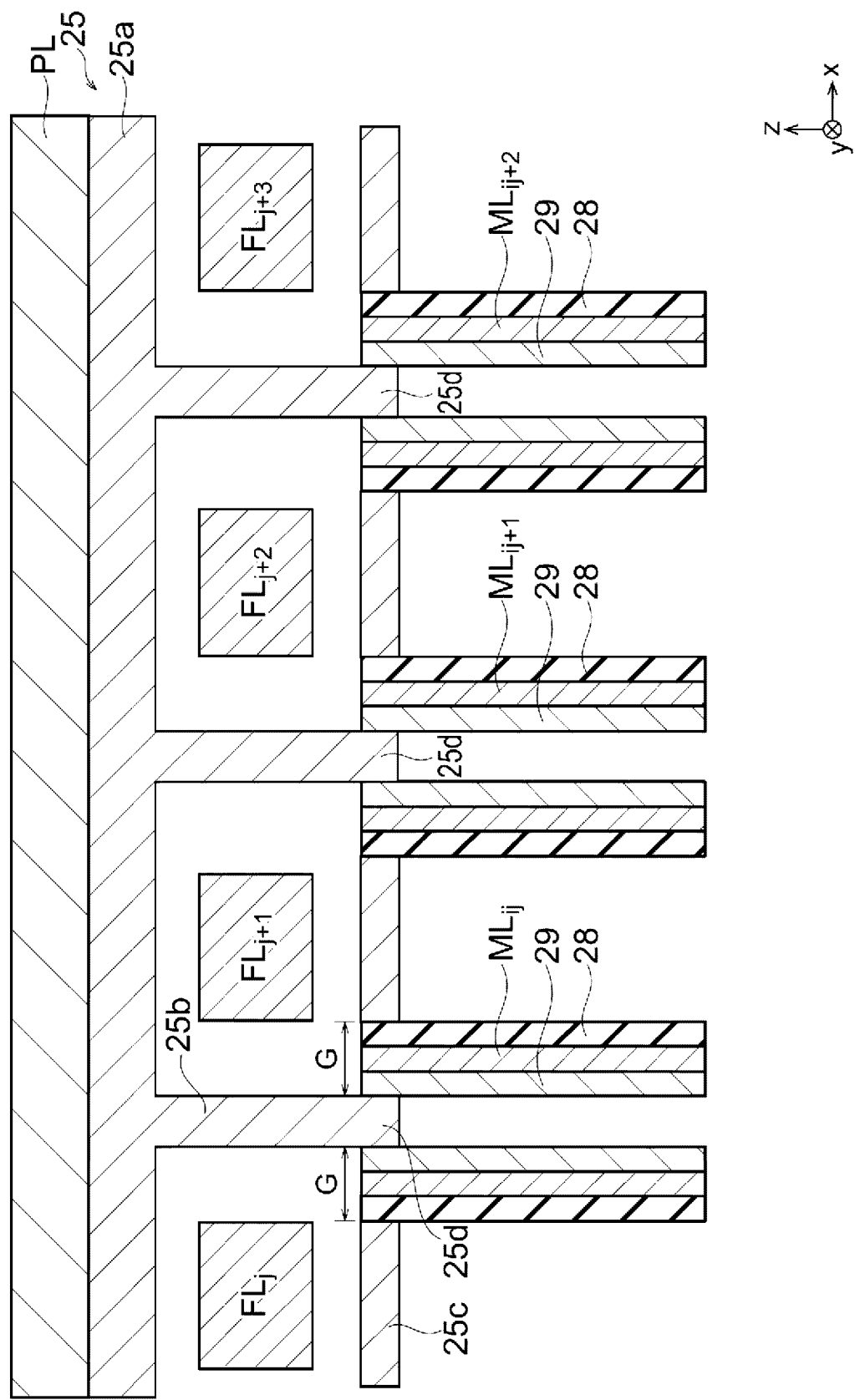
FIG. 5 is a cross-sectional view showing another configuration example of a yoke, a field line, and a magnetic member.

FIG. 5 is a cross-sectional view showing another configuration example of a yoke, a field line, and a magnetic member. The magnetic gap of the magnetic circuit 25 can also be obtained with the configuration shown in FIG. 5. In the case shown in FIG. 5, in FIG. 4, a non-magnetic conductive layer 29 is provided between each of the magnetic members MLij and the yoke $25d$. The non-magnetic conductive layer 29 is disposed along the z direction on the inner surface of each of the magnetic members MLij. In this case, the width of the magnetic gap G in the x direction is the sum of the x direction thickness of the non-magnetic conductive layer 29, the x direction thickness of each of the magnetic members MLij, and the x direction thickness of the insulating layer 28. FIGS. 4 and 5, a non-magnetic conductive layer may be used instead of the insulating layer 28. Further, each of the magnetic members MLij may include a stacked structure of a magnetic layer (for example, CoFeB) and an insulating layer (for example, MgO). In this case, it is preferable to remove the insulating layer at the coupling portion with the yoke $25d$ and bring the yoke $25d$ and the magnetic layer into contact to electrically couple the yoke $25d$ to the magnetic layer. Since the MgO layer is an extremely thin layer, a leak current may pass through the layer. Therefore, the MgO layer may not necessarily have to be removed.

Further, although each of the magnetic members MLij is electrically coupled to the yokes $25b$ and $25d$ as shown in FIG. 4 in the present embodiment, each of the magnetic members MLij may be electrically coupled to the yoke $25c$ instead. In this case, the yoke $25c$ is preferably electrically coupled to the yoke $25a$ elsewhere. A non-magnetic layer may be provided between each of the magnetic members MLij and at least one of the yoke $25d$ and the yoke $25c$. Furthermore, each of the magnetic members MLij may be electrically coupled to both the yoke $25d$ and the yoke $25c$. In this case, a non-magnetic conductive layer may be provided between each of the magnetic members MLij and at least one of the yoke $25d$ and the yoke $25c$.

Returning to FIG. 2 again, the magnetic memory of the present embodiment will be described. The magnetoresistive element $14ij$ reads out the information written in the magnetic member MLij, and for example, an MTJ element is used. Hereinafter, the magnetoresistive element $14ij$ will be described as an MTJ element as an example. The MTJ element $14ij$ includes a free layer (i.e., a magnetization variable layer) $14a$ with a variable magnetization direction, a fixed layer (i.e., a magnetization fixed layer) $14c$ with a fixed magnetization direction, and a non-magnetic insulating layer $14b$ disposed between the free layer $14a$ and the fixed layer $14c$. In the MTJ element $14ij$, the free layer $14a$ is electrically coupled to the first end portion $11a$ of the magnetic member MLij via the corresponding non-magnetic conductive layer $12ij$. The fixed layer $14c$ is electrically coupled to the corresponding vertical thin film transistor $18ij$ via the corresponding non-magnetic conductive layer $16ij$. Here, "the magnetization direction is variable" means that the magnetization direction can be changed by a leakage magnetic field from the corresponding magnetic member MLij in a read operation to be described later. "The magnetization direction is fixed" means that the magnetization direction is not changed by a leakage magnetic field from the corresponding magnetic member MLij. The arrangement of the free layer $14a$ and the fixed layer $14c$ may be reversed. In this case, the free layer $14a$ is electrically coupled to the vertical thin film transistor $18ij$, and the fixed layer $14c$ is electrically coupled to the first end portion $11a$ of the magnetic member MLij. The configuration of the MTJ element $14ij$ will be described later.

The vertical thin film transistor $18ij$ includes a channel layer $18a$ and a gate electrode portion SGj. One end of the channel layer $18a$ is electrically coupled to the fixed layer $14c$ of the MTJ element $14ij$ through the non-magnetic conductive layer $16ij$, and the other end is electrically coupled to the bit line BLi through the non-magnetic conductive layer $19ij$. The channel layer $18a$ extends in the z direction. The gate electrode portions SGj are disposed to surround the channel layer $18a$ or to have the channel layer $18a$ interposed therebetween. That is, the gate electrode portion SGj covers at least a portion of the channel layer $18a$. The channel layer $18a$ includes, for example, crystalline silicon. The gate electrode portion SGj (j=1 to n)

extends along the y direction and is coupled to and controlled by the control circuit 100 of FIG. 1.

By turning on the vertical thin film transistor 18*ij*, a current is passed between the plate electrode PL and the bit line BL through the magnetic member ML*ij*. As a result, the magnetic domain formed as write data at the second end portion 11*b* of the magnetic member ML*ij* is shifted in the z direction in the magnetic member ML*ij* to write data into the magnetic member ML*ij*. Further, at the time of reading, by turning on the vertical thin film transistor 18*ij*, a current is passed between the plate electrode PL and the bit line BL through the magnetic member ML*ij*. As a result, the magnetic domain corresponding to the written data is shifted in the z direction to the first end portion 11*a*, and the magnetization of the free layer 14*a* of the MTJ element 14*ij* is set in the direction corresponding to the write data, and reading is performed.

The yokes 25*a*, 25*b*, 25*c*, and 25*d* are disposed to surround a portion of each of the field lines FL1 to FLn+1, as shown in FIG. 2. For example, the yoke 25*a* is disposed to face the upper surface of each of the field lines to cover the upper surface. The yoke (also called a return yoke) 25*c* is disposed to face the lower surface of each of the field lines FL1 to FLn+1. The yoke 25*b* is coupled between the yoke 25*a* and the yoke 25*d* and is disposed on the side portion of each of the field lines. The yoke 25*a* is spaced apart from the upper surface of each of the field lines FL1 to FLn+1, the yoke 25*b* is spaced apart from the side surface of each of the field lines, and the yoke 25*c* is spaced apart from the lower surface of each of the field lines FL1 to FLn+1.

Write Operation

Next, a write operation for the magnetic memory of the present embodiment will be described.

For example, in writing to the memory unit 10*ij*, the control circuit 100 cause write currents in opposite directions to pass through the two field line FL*j* and field line FL*j+1*. For example, when writing is performed to the memory unit 1011, first, write currents in opposite directions are caused to pass through the field line FL1 and the field line FL2. At this time, in FIG. 2, a write current passes from the front to the back in the field line FL1, and in FIG. 2, a write current passes from the back to the front in the field line FL2. A current magnetic field in a clockwise direction is generated around the field line FL1, and a current magnetic field in a counterclockwise direction is generated around the field line FL2. Due to these current magnetic fields, a magnetic field is also induced in each of the yokes 25*a*, 25*b*, 25*c*, and 25*d* surrounding each field line. With this write current, information (i.e., a magnetization direction) corresponding to each write current is written to the upper portion (i.e., the second end portion 11*b*) of the magnetic member ML11 of the memory unit 1011 positioned below between the adjacent field lines, for example, the field line FL1 and the field line FL2. The information (i.e., the magnetization direction) to be written at this time is a magnetization direction in a direction along the x-y plane and from the inner circumference to the outer circumference of the magnetic member ML11.

On the other hand, when the direction of the write current passing through the field line FL1 and the field line FL2 is opposite to the direction described above, the information (i.e., the magnetization direction) written in the magnetic member ML11 of the memory unit 1011 is a magnetization direction in a direction along the x-y plane and from the outer circumference to the inner circumference of the magnetic member ML11.

By performing such a writing operation, information is written to the upper portion (i.e., the second end portion 11*b*) of the magnetic member ML11. Subsequently, a shift current for moving the magnetic wall of the magnetic member ML11 between the bit line BL and the plate electrode PL is caused to pass by the control circuit 101, and the written information is moved downward and stored in the storage area (i.e., a shift operation). The polarity of the shift current is determined according to the material of the magnetic member ML11 and the like.

Read Operation

Next, the read operation will be described. When information is read from the memory unit 1011, in a case where the information to be read is positioned at the lowermost portion of the magnetic member ML11 of the memory unit 1011, that is, the area 11*c* (i.e., the first end portion 11*a*) close to the MTJ element 1411, the magnetization direction of the free layer 14*a* of the MTJ element 1411 is also changed corresponding to the information stored in the lowermost portion of the magnetic member ML11. Therefore, the control circuit 101 can cause a read current to pass between the plate electrode PL and the bit line BL and to read the information from the MTJ element 1411. The read information corresponds to the resistance state of the MTJ element 1411. The case where the resistance state of the MTJ element 1411 is high and the case where the resistance state of the MTJ element 1411 is low will be described later.

When the information to be read is not present at the lowermost portion of the magnetic member ML11 of the memory unit 1011, a shift current is passed between the plate electrode PL and the bit line BL by using the control circuit 101, and the information to be read is moved to be positioned at the lowermost portion of the magnetic member ML11 (i.e., a shift operation). After that, the information can be read by performing the read operation mentioned above.

Configuration of MTJ Element

Figure 6:
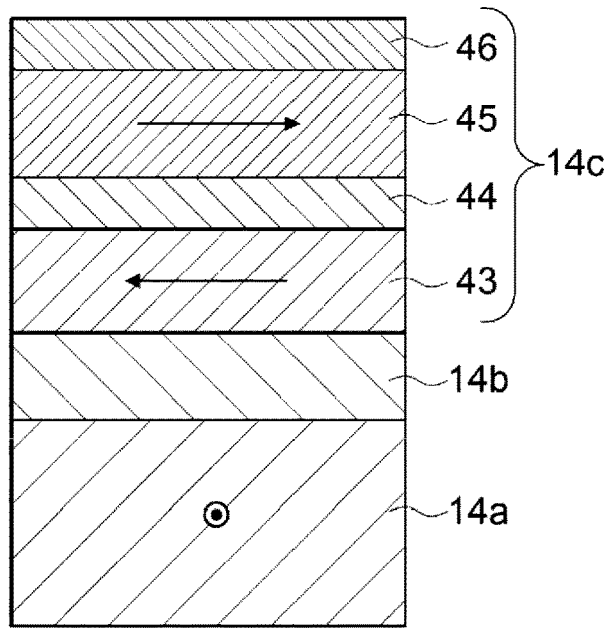
FIG. 6 is a cross-sectional view of a magnetic tunnel junction (MTJ) element according to the first embodiment.
Figure 6:
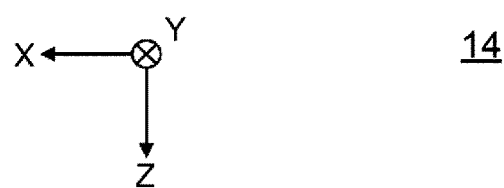

FIG. 6 is a cross-sectional view of an MTJ element according to the first embodiment. In FIG. 6, the display is reversed up and down in the z direction with respect to FIG. 2.

The free layer 14*a* of the MTJ element 14*ij* (hereinafter, also referred to as the MTJ element 14) is made of a ferromagnetic material. The free layer 14*a* has an axial direction for easy magnetization in a direction substantially parallel to the x-y plane. The axial direction for easy magnetization of the free layer 14*a* is the longitudinal direction of the MTJ element 14. The ferromagnetic body 41 may include, for example, cobalt iron boron (CoFeB) or iron boride (FeB) and may have a body-centered cubic crystal structure. The free layer 14*a* is an example of a magnetization variable layer with a variable magnetization direction.

The non-magnetic insulating layer 14*b* is a non-magnetic insulating film and contains, for example, magnesium oxide (MgO). The non-magnetic insulating layer 14*b* is provided between the free layer 14*a* and the fixed layer 14*c* and functions as a tunnel barrier film. That is, the non-magnetic insulating layer 14*b* configures the magnetic tunnel junction between the free layer 14*a* and the fixed layer 14*c*.

The fixed layer 14*c* is formed of a stacked film of the ferromagnetic layer 43, the non-magnetic layer 44, the ferromagnetic layer 45, and the antiferromagnetic layer 46. The fixed layer 14*c* is an example of a magnetization fixed layer with a fixed magnetization direction.

The ferromagnetic layer 43 is made of a ferromagnetic material. When the axial direction for easy magnetization of the free layer 14*a* is the −y direction, the magnetization direction of the ferromagnetic layer 43 is, for example, the +x direction. The ferromagnetic layer 43 contains, for example, cobalt iron boron (CoFeB) or iron boride (FeB). The magnetization direction of the ferromagnetic layer 43 is fixed and is directed to the +x direction. The phrase "the magnetization direction is fixed" means that the magnetization direction does not change due to a magnetic field having a magnitude that may rotate the magnetization direction of the free layer 14a.

The non-magnetic layer 44 is a non-magnetic conductive material and contains, for example, at least one element selected from ruthenium (Ru), osmium (Os), iridium (Ir), vanadium (V), and chromium (Cr). The film thickness of the non-magnetic layer 44 is adjusted such that the layer 44 exhibits the antiferromagnetic exchange coupling between the ferromagnetic layer 43 and the ferromagnetic layer 45 in the fixed layer 14c. That is, the ferromagnetic layers 43 and 45 are coupled so as to have magnetization directions antiparallel to each other.

The axial direction for easy magnetization of the ferromagnetic layer 45 is a direction opposite to that of the ferromagnetic layer 43, for example, the −x direction. The ferromagnetic layer 45 contains, for example, at least one alloy selected from ferrocobalt (CoFe), cobalt platinum (CoPt), cobalt nickel (CoNi), and cobalt palladium (CoPd). The magnetization direction of the ferromagnetic layer 45 is fixed and is directed to the −x direction.

The antiferromagnetic layer 46 includes, for example, an alloy such as iridium manganese (IrMn). The antiferromagnetic layer 46 is stacked on the ferromagnetic layer 45. For example, the antiferromagnetic layer 46 is annealed at a temperature of about 300 degrees in a state where the antiferromagnetic layer 46 is in contact with the ferromagnetic layer 45 and a magnetic field of about 10 kOe is applied to the antiferromagnetic layer 46, and then cooled to room temperature. As a result, exchange magnetic anisotropy is induced at the interface between the antiferromagnetic layer 46 and the ferromagnetic layer 45, and unidirectional magnetic anisotropy is generated in the direction of the applied magnetic field with respect to the ferromagnetic layer 45, whereby the magnetization direction is fixed.

Arrangement of MTJ Element

Figure 7:
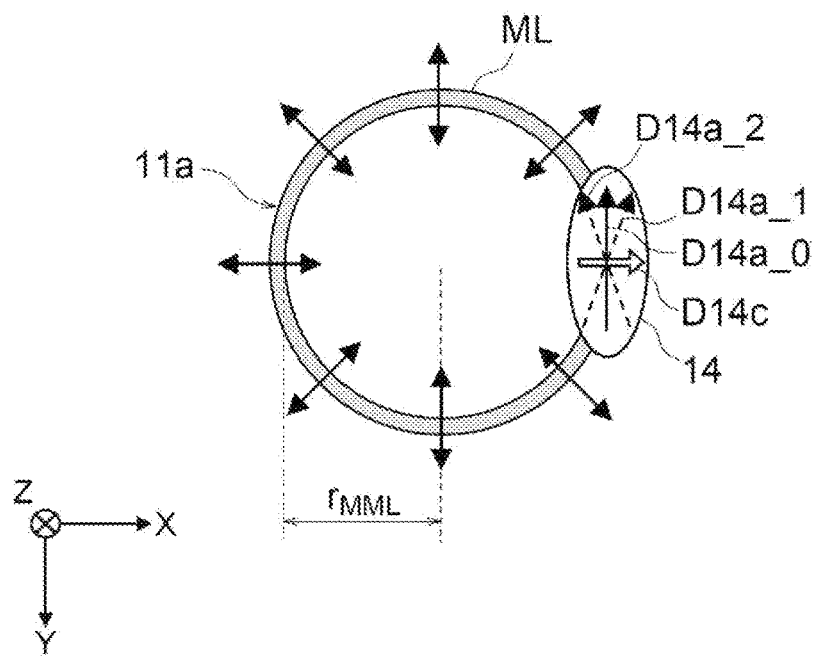
FIG. 7 is a diagram showing an arrangement of an MTJ element and a magnetic member according to the first embodiment.

FIG. 7 is a diagram showing an arrangement of an MTJ element and a magnetic member according to the first embodiment. FIG. 7 is a plan view when viewed from the z direction in FIG. 2. In FIG. 7, a first end portion 11a side of the magnetic member MLij (hereinafter, also referred to as the magnetic member ML) is shown.

In a plan view in the z direction, the magnetic member ML has a substantially cylindrical shape, and a radial component of the leakage magnetic field in the x-y plane is generated in the radial direction.

In a plan view in the z direction, the MTJ element 14 overlaps a part of an outer edge (or periphery) of the first magnetic member ML on a first end portion 11a side. Hereinafter, the outer edge portion of the first end portion 11a of the magnetic member ML overlapping with the MTJ element 14 is also referred to as an overlapping portion. In addition, in a plan view in the z direction, the MTJ element 14 has a longitudinal direction and a width direction, and has a shape such as a substantially elliptical shape or a substantially rectangular shape. In the present embodiment, the longitudinal direction of the MTJ element 14 substantially coincides with the tangential direction in the overlapping portion of the outer edge of the magnetic member ML.

The magnetization direction D14c of the fixed layer 14c faces the radial direction (i.e., the +x direction) of the magnetic member ML. Therefore, in a plan view in the z direction, the longitudinal direction of the MTJ element 14 is different from the magnetization direction of the fixed layer 14c. The magnetization direction D14c of the fixed layer 14c is a normal direction of the overlapping portion or a radial direction (i.e., the +x direction) of the magnetic member ML in the overlapping portion in a plan view in the z direction.

The magnetization directions D14a_0 to D14a_2 of the free layer 14a are inclined from the tangential direction in the overlapping portion of the magnetic member ML depending on the leakage magnetic field at the first end portion 11a of the magnetic member ML in the plan view in the z direction. For example, the magnetization direction of the free layer 14a when the free layer 14a is not affected by the magnetic field from the magnetic member ML is set as D14a_0. When the leakage magnetic field received by the free layer 14a from the magnetic member ML is directed outward in the radial direction (i.e., the +x direction) of the magnetic member ML, the magnetization direction of the free layer 14a is D14a_1. When the leakage magnetic field received by the free layer 14a from the magnetic member ML is directed inward in the radial direction (i.e., the −x direction) of the magnetic member ML, the magnetization direction of the free layer 14a is D14a_2. The inclination angles of the magnetization directions D14a_1 and D14a_2 of the free layer 14a depend on the magnitude of the leakage magnetic field from the magnetic member ML that is applied to the free layer 14a.

As described above, in a plan view in the z direction, the magnetization direction of the free layer 14a intersects with the magnetization direction (i.e., the +x direction) of the fixed layer 14c at an angle larger than 0 degrees and smaller than 180 degrees. That is, the magnetization direction of the free layer 14a and the magnetization direction of the fixed layer 14c are not parallel (i.e., 0 degrees) or antiparallel (i.e., 180 degrees) to each other, but intersect at an inclination angle other than 0 degrees and 180 degrees.

Figure 8:
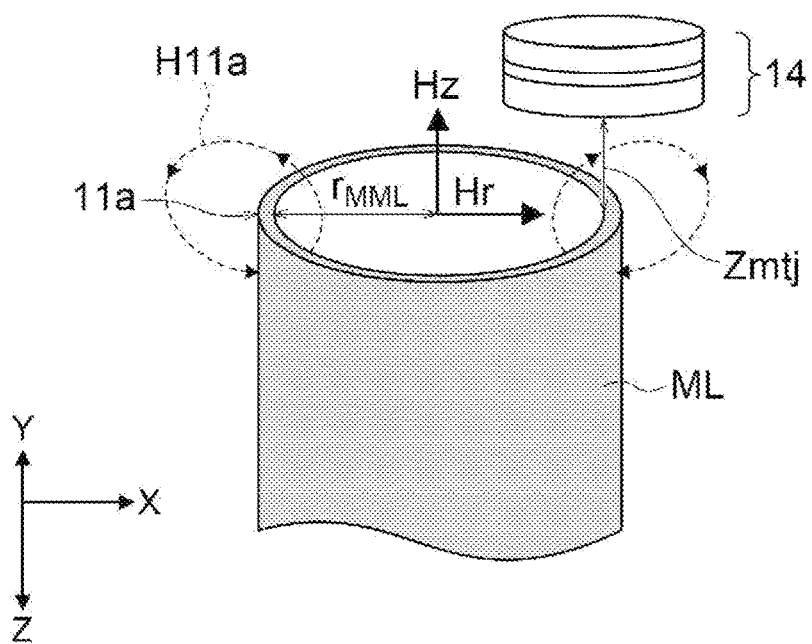
FIG. 8 is a perspective view showing an arrangement of an MTJ element and a magnetic member according to the first embodiment.

FIG. 8 is a perspective view showing an arrangement of an MTJ element and a magnetic member according to the first embodiment. In FIG. 8, the display is reversed up and down in the z direction with respect to FIG. 2. Therefore, in FIG. 8, a first end portion 11a side of the magnetic member MLij is shown. The MTJ element 14 is separated in the −z direction by Zmtj from the first end portion 11a of the magnetic member ML. Although not shown in FIG. 8, the non-magnetic conductive layer 12 of FIG. 2 is provided between the MTJ element 14 and the magnetic member ML.

The radius of the first end portion 11a of the magnetic member ML is denoted by rMML. In this case, in a plan view in the z direction, the position of the center of gravity of the MTJ element 14 is disposed within a range of ±rMML/5 in the normal direction of the magnetic member ML or in the radial direction (i.e., the x direction) of the magnetic member ML with the first end portion 11a of the overlapping portion as a center. The leakage magnetic field H11a from the first end portion 11a of the magnetic member ML is generated in a direction oblique to the −z direction (for example, a direction inclined at 45 degrees) as shown in FIG. 8. In order for the MTJ element 14 to receive a larger number of leakage magnetic fields H11a, it is preferable that the center of gravity of the MTJ element 14 is disposed in a range of ±r MML/5 in the x direction with the first end portion 11a of the overlapping portion as the center.

Figure 9:
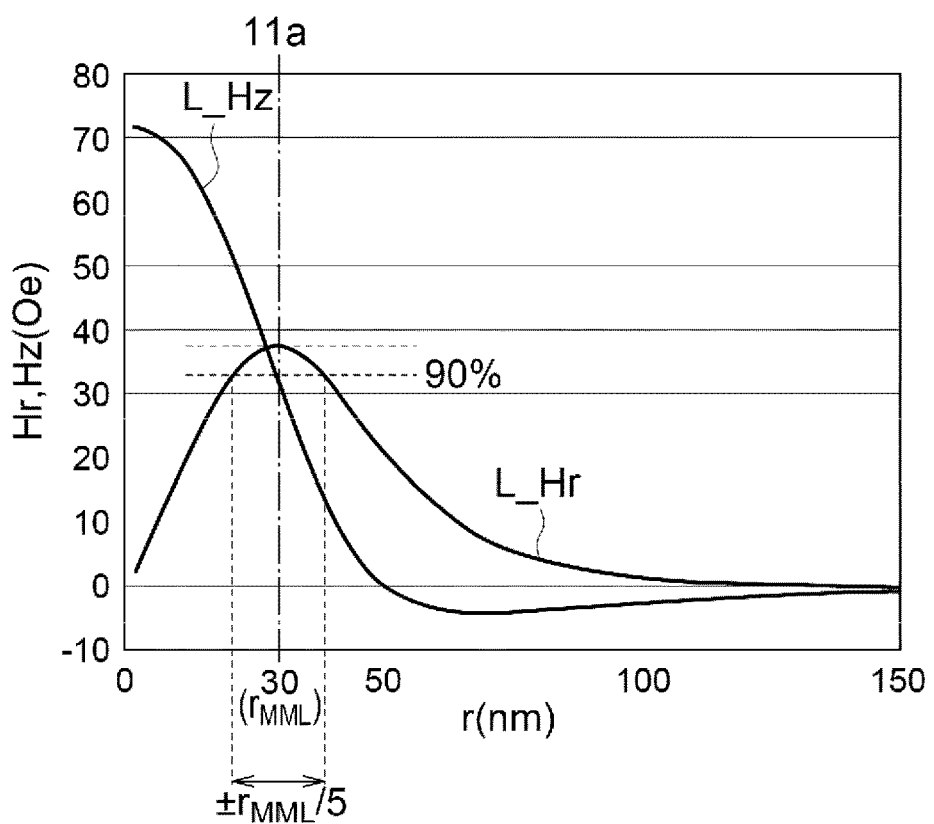
FIG. 9 is a graph showing a leakage magnetic field from a first end portion of a magnetic member.

FIG. 9 is a graph showing a simulation result of a leakage magnetic field from a first end portion of a magnetic member. The horizontal axis of the graph indicates the distance r from the central axis of the magnetic member ML.

The vertical axis indicates the magnitudes of the component Hr of the leakage magnetic field in the x-y plane and the component Hz in the z direction. The component Hr may be referred to as a component in the normal direction of the magnetic member ML or a component in the radial direction of the magnetic member ML from the overlapping portion. The component Hz may be referred to as a component in the extension direction of the magnetic member ML. In addition, the component Hr and the component Hz are orthogonal to each other, and $(Hr2+Hz2)^{1/2}$ is the magnitude of the entire leakage magnetic field. In this simulation, the distance Zmtj from the first end portion 11a of the magnetic member ML to the MTJ element 14 is set to about 30 nm. In addition, the magnetic member ML is assumed to be a cylindrical shape having a radius of 30 nm. The film thickness of the magnetic member ML is 1 nm. A simulation was performed on the magnetic member ML as a perpendicular magnetization film having a saturation magnetization (Ms) of 1000 emu/cc.

The line L_Hr is a line indicating the magnitude of the component Hr. The line L_Hz is a line indicating the magnitude of the component Hz.

As shown by the line L_Hz, the component Hz is larger as the position is closer to the central axis of the magnetic member ML, and is smaller as the position is farther from the central axis.

Meanwhile, as shown by the line L_Hr, the component Hr is larger as the position is closer to the first end portion 11a of the magnetic member ML, and is smaller as the position is farther from the first end portion 11a. That is, the component Hr is maximum at the first end portion 11a and has a peak.

Here, the component Hr of the leakage magnetic field in the x-y plane is largest in the vicinity of the first end portion 11a. The MTJ element 14 detects a component of the magnetic field in the x-y plane. Therefore, in the plan view in the z direction, the MTJ element 14 can receive a large leakage magnetic field at a position (i.e., an overlapping portion) overlapping the first end portion 11a of the magnetic member ML in accordance with the peak of the component Hr. Since the MTJ element 14 detects the component of the magnetic field in the x-y plane, the larger the component Hr, the more reliably the MTJ element 14 can detect the signal.

For example, when the position of the MTJ element 14 in the x direction (i.e., the radial direction of the magnetic member ML) is set such that the component Hr is 90% or more of the peak, the position of the center of gravity of the MTJ element 14 is preferably disposed in a range of ±rMML/5 in the normal direction of the magnetic member ML or in the radial direction (i.e., the x direction) of the magnetic member ML with the first end portion 11a of the overlapping portion as the center in a plan view in the z direction. Accordingly, the MTJ element 14 can efficiently detect a large leakage magnetic field from the magnetic member ML.

Figure 10:
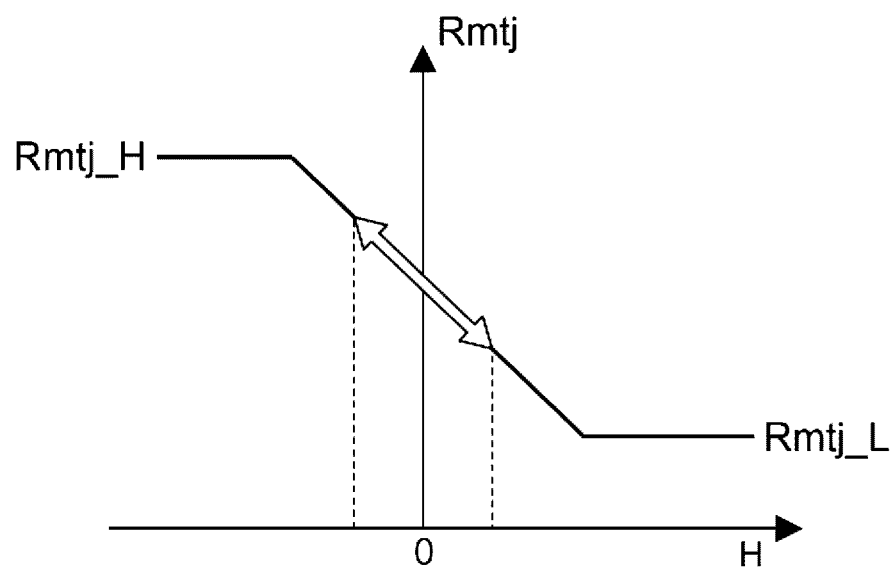
FIG. 10 is a graph showing a relationship between a leakage magnetic field and a resistance value of an MTJ element.

FIG. 10 is a graph showing a relationship between a leakage magnetic field and a resistance value of an MTJ element. The horizontal axis of this graph indicates the magnitude of the leakage magnetic field H received by the MTJ element 14. The vertical axis indicates the resistance value Rmtj of the MTJ element 14.

The leakage magnetic field H is positive in the outward radial direction (i.e., the +x direction) of the magnetic member ML and negative in the opposite direction. In this case, the MTJ element 14 has a high resistance Rmtj_H when the leakage magnetic field H is a negative value, and has a low resistance Rmtj_L when the leakage magnetic field H is a positive value. When the leakage magnetic field H is close to 0, the resistance value Rmtj is a resistance value between the high resistance Rmtj_H and the low resistance Rmtj_L. The resistance value Rmtj changes depending on the leakage magnetic field H.

In the present embodiment, the magnetization direction of the free layer 14a of the MTJ element 14 and the magnetization direction of the fixed layer 14c are not parallel (i.e., 0 degrees) or antiparallel (i.e., 180 degrees) to each other, but intersect at an inclination angle other than 0 degrees and 180 degrees. Even when the leakage magnetic field H is close to 0, the intersection angle between the magnetization direction of the free layer 14a and the magnetization direction of the fixed layer 14c changes depending on the leakage magnetic field H. Therefore, even when the leakage magnetic field H is close to 0, the resistance value Rmtj changes depending on the leakage magnetic field H. Accordingly, the MTJ element 14 can detect the leakage magnetic field H even when the leakage magnetic field H from the magnetic member ML is relatively small (i.e., even when the signal is weak). Therefore, the MTJ element 14 according to the present embodiment can take a wide detection window of the leakage magnetic field H and can detect the leakage magnetic field H with high sensitivity.

Figure 11:
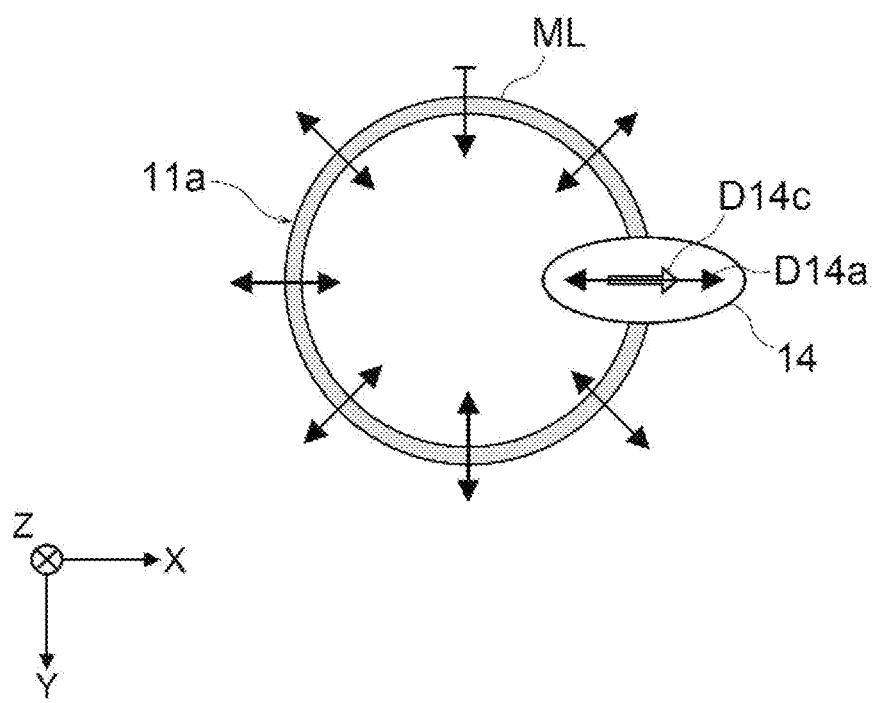
FIG. 11 is a diagram showing an arrangement of an MTJ element and a magnetic member of a comparative example.

FIG. 11 is a diagram showing an arrangement of an MTJ element and a magnetic member of a comparative example. In the comparative example, in a plan view in the z direction, the longitudinal direction of the MTJ element 14 is a normal direction in an overlapping portion of the outer edge of the magnetic member ML. In addition, the magnetization direction D14c of the fixed layer 14c is the radial direction (i.e., the x direction) of the magnetic member ML. Further, the magnetization direction D14a of the free layer 14a is a normal direction in the overlapping portion of the magnetic member ML in the plan view from the z direction, and is parallel or antiparallel to the magnetization direction D14c of the fixed layer 14c. In this case, the magnetization direction D14a of the free layer 14a is switched to be parallel or antiparallel by the leakage magnetic field H from the magnetic member ML.

Figure 12:
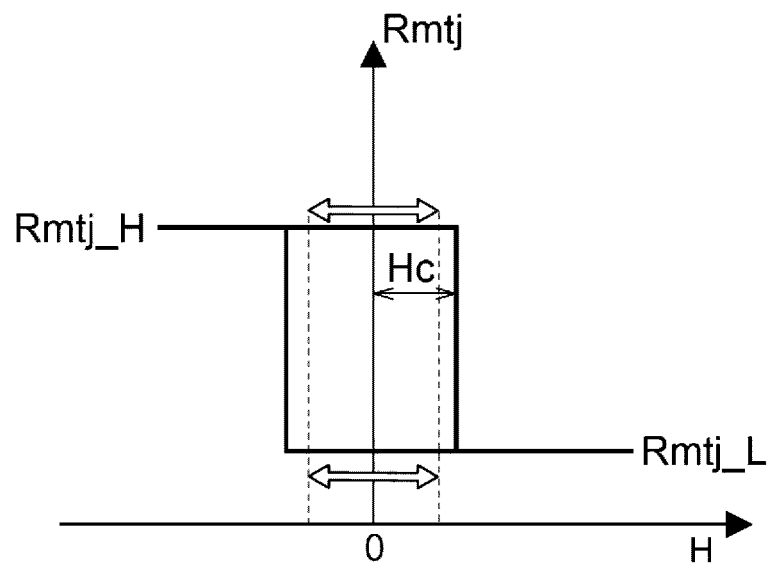
FIG. 12 is a graph showing a relationship between a leakage magnetic field and a resistance value of the MTJ element in the comparative example of FIG. 11.

FIG. 12 is a graph showing a relationship between a leakage magnetic field and a resistance value of the MTJ element in the comparative example of FIG. 11. The horizontal axis of this graph indicates the magnitude of the leakage magnetic field H received by the MTJ element 14. The vertical axis indicates the resistance value Rmtj of the MTJ element 14.

In this case, the resistance value Rmtj of the MTJ element 14 has hysteresis. Therefore, when the leakage magnetic field H does not exceed the positive predetermined value, the resistance value Rmtj of the MTJ element 14 is not switched from the high resistance Rmtj_H to the low resistance Rmtj_L. When the leakage magnetic field H does not fall below the negative predetermined value, the resistance value Rmtj of the MTJ element 14 is not switched from the low resistance Rmtj_L to the high resistance Rmtj_H. That is, when the leakage magnetic field H does not exceed a predetermined value (for example, Hc) as the absolute value, the resistance value Rmtj does not switch between the high resistance Rmtj_H and the low resistance Rmtj_L. When the leakage magnetic field H is smaller than the predetermined value Hc and close to 0, the resistance value Rmtj maintains the existing resistance state (i.e., the high resistance Rmtj_H or low resistance Rmtj_L). Accordingly, the MTJ element 14 cannot detect the leakage magnetic field H when the leakage magnetic field H from the magnetic member ML is relatively small.

On the other hand, as described above, according to the present embodiment, the resistance value Rmtj changes depending on the leakage magnetic field H even when the absolute value of the leakage magnetic field H is equal to or less than the predetermined value Hc. Accordingly, the MTJ element 14 can detect the leakage magnetic field H even when the leakage magnetic field H from the magnetic member ML is relatively small (i.e., even when the signal is weak).

Figure 13:
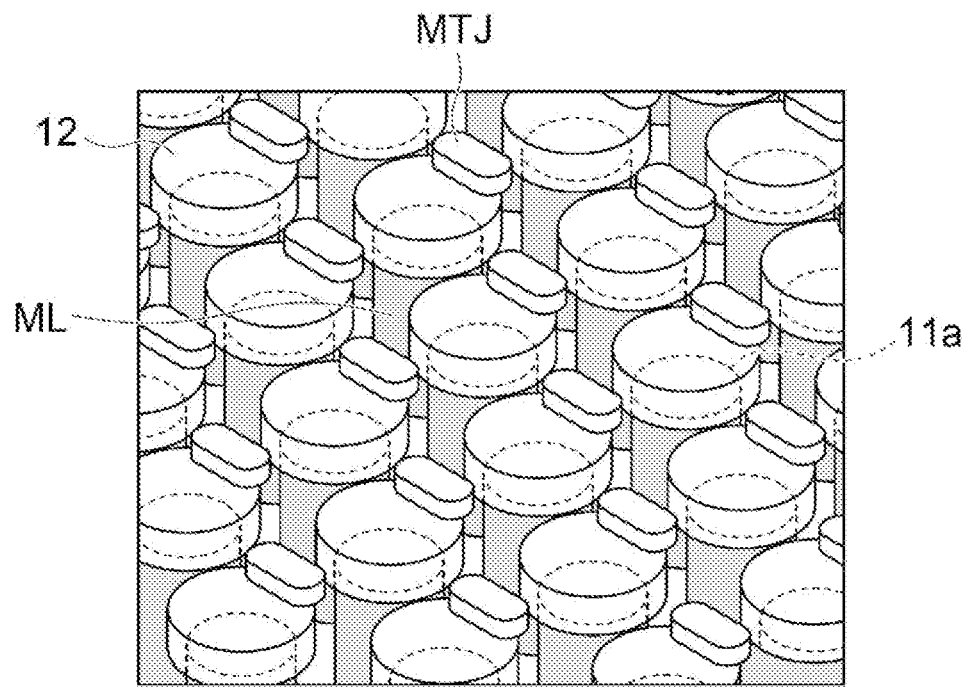
FIG. 13 is a perspective view of a memory cell array according to the first embodiment as viewed from the MTJ element side.
Figure 14:
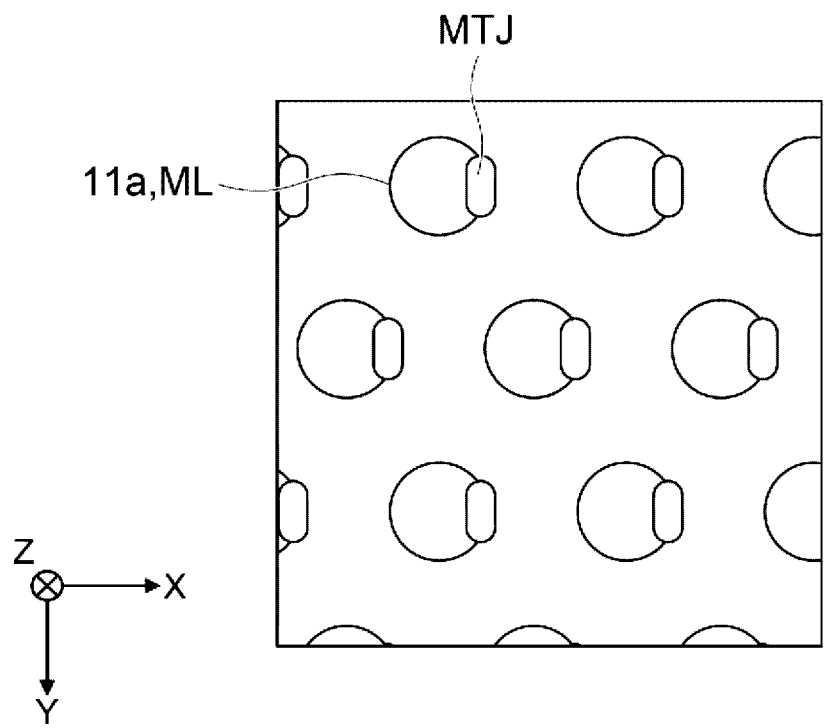
FIG. 14 is a plan view showing a configuration example of a memory cell array as viewed from the MTJ element side.

FIG. 13 is a perspective view of a memory cell array according to the first embodiment as viewed from the MTJ element side. FIG. 14 is a plan view showing a configuration example of a memory cell array as viewed from the MTJ element side. As shown in FIG. 13, a non-magnetic conductive layer 12 is provided on the first end portion 11a of the magnetic member ML, and the MTJ element 14 is provided on the non-magnetic conductive layer 12.

As shown in FIG. 14, the longitudinal direction of the MTJ element 14 substantially coincides with the tangential direction in the overlapping portion of the outer edge of the magnetic member ML. The MTJ elements 14 are unevenly distributed in the same direction as the first end portion 11a of each of the magnetic members ML. The leakage magnetic field of a certain magnetic member ML affects not only the MTJ element 14 directly above the magnetic member ML but also the MTJ element 14 on the adjacent magnetic member ML. The influence of the leakage magnetic field from the adjacent magnetic members ML is also referred to as interference between adjacent cells. As shown in FIG. 14, by causing the MTJ elements 14 to be unevenly distributed in the same direction of the first end portion 11a of each of the magnetic members ML, the interference between adjacent cells can be made substantially uniform in the plurality of MTJ elements 14.

Second Embodiment

Figure 15:
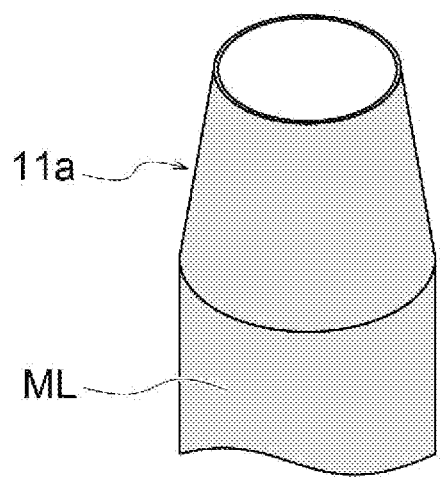
FIG. 15 is a perspective view of a magnetic member of the magnetic memory according to a second embodiment.
Figure 16:
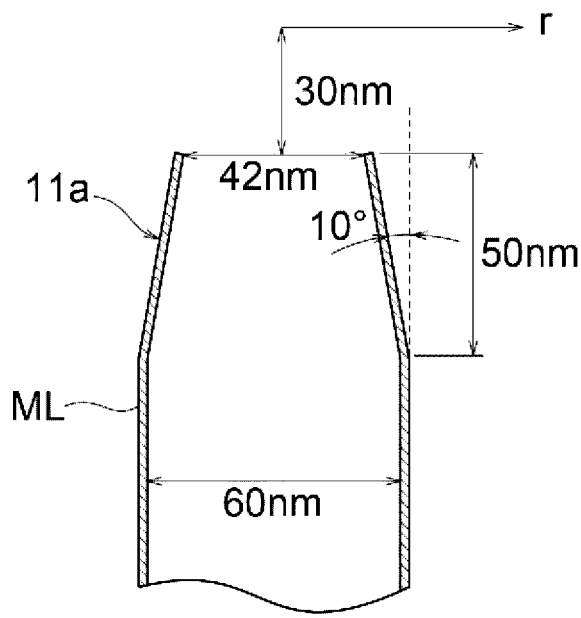
FIG. 16 is a cross-sectional view of the magnetic member of the magnetic memory according to the second embodiment.

FIG. 15 is a perspective view of a magnetic member ML of a magnetic memory according to the second embodiment. FIG. 16 is a cross-sectional view of the magnetic member ML of the magnetic memory according to the second embodiment. According to the second embodiment, the first end portion 11a of the magnetic member ML is inclined toward the inside of the magnetic member ML with respect to the extension direction (i.e., the z direction) of the magnetic member ML. Therefore, the opening of the first end portion 11a of the magnetic member ML is reduced toward the end surface of the first end portion 11a. In addition, the opening of the first end portion 11a of the magnetic member ML is smaller than the opening of the second end portion 11b.

For example, as shown in FIG. 16, the first end portion 11a is inclined from a position 50 nm away from the end surface of the magnetic member ML. The first end portion 11a is inclined at an angle of about 10 degrees toward the inside of the magnetic member ML with respect to the extension direction (i.e., the z direction) of the magnetic member ML. The diameter of the magnetic member ML on the second end portion 11b side from the first end portion 11a is set to about 60 nm, and the opening diameter of the end surface of the first end portion 11a is set to about 42 nm.

Figure 17:
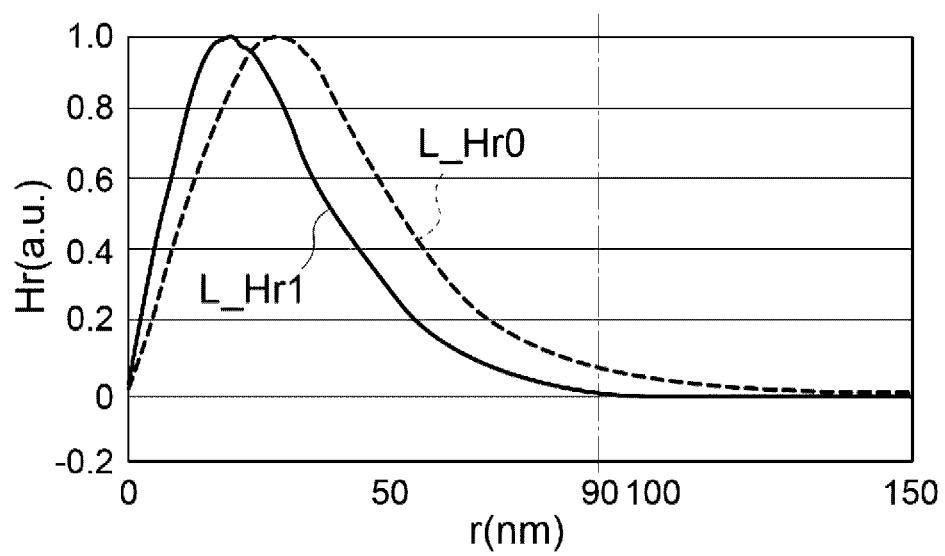
FIG. 17 is a graph showing a component of a leakage magnetic field and a distance from a central axis of the magnetic member.

FIG. 17 is a graph showing a simulation result of a component Hr of a leakage magnetic field in the x-y plane and a distance r from a central axis of the magnetic member. The horizontal axis of the graph indicates the distance r from the central axis of the magnetic member ML. The vertical axis indicates the magnitude of the component Hr of the leakage magnetic field in the x-y plane. In this simulation, the distance Zmtj from the first end portion 11a of the magnetic member ML to the MTJ element 14 is set to about 30 nm. The film thickness of the magnetic member ML is 1 nm. The vertical axis is normalized.

Figure 18:
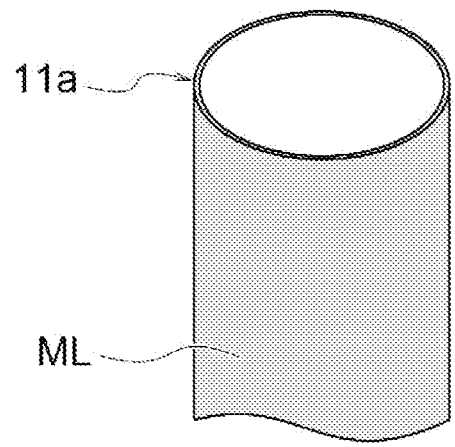
FIG. 18 is a perspective view showing a configuration of a magnetic member of a magnetic memory according to a comparative example.

As shown in FIG. 18 as a comparative example, the line L_Hr0 is a line indicating the component Hr of the leakage magnetic field of the magnetic member ML in which the first end portion 11a is not inclined. As shown in FIG. 15, the line L_Hr1 is a line indicating the component Hr of the leakage magnetic field of the magnetic member ML in which the first end portion 11a according to the second embodiment is inclined.

The lines L_Hr0 and L_Hr1 have the maximum value (i.e., the peak) as the distance r increases, and then attenuate. In addition, as the distance r increases, the line L_Hr1 attenuates faster than the line L_Hr0. That is, as the distance r increases, in the magnetic member ML of the second embodiment, a component Hr of the leakage magnetic field attenuates faster than that of the comparative example.

For example, it is assumed that the distance r between adjacent magnetic members ML is 90 nm. In this case, in a case where the leakage magnetic fields when r is 90 nm or more are compared, the line L_Hr1 is smaller than the line L_Hr0. That is, the interference between adjacent cells is smaller in the second embodiment indicated by the line L_Hr1 than in the comparative example indicated by the line L_Hr0.

Figure 19:
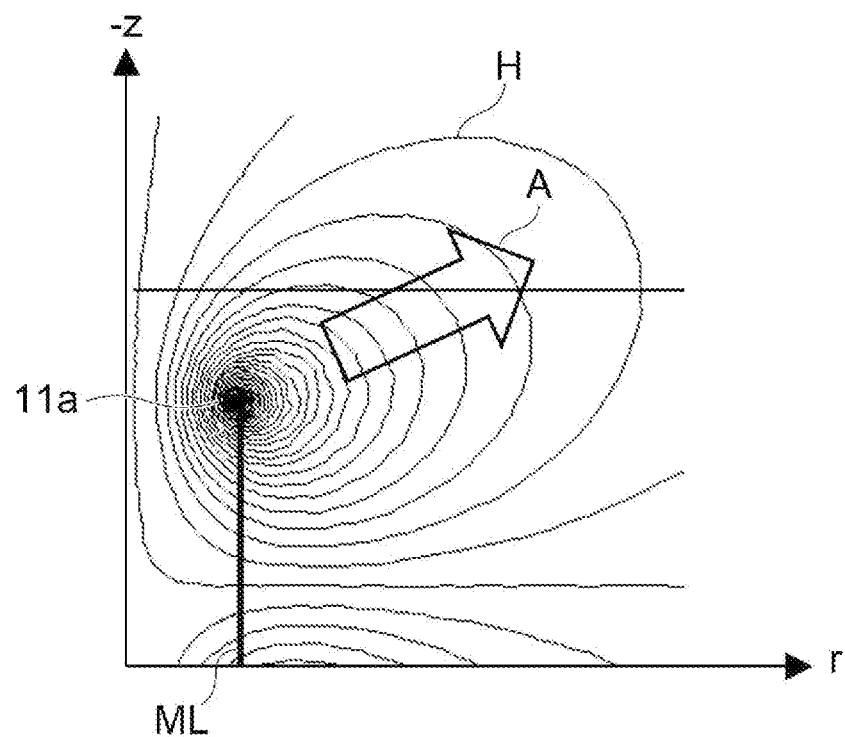
FIG. 19 is a diagram showing magnetic force lines of a leakage magnetic field generated from a first end portion of the magnetic member of the comparative example shown in FIG. 18.
Figure 20:
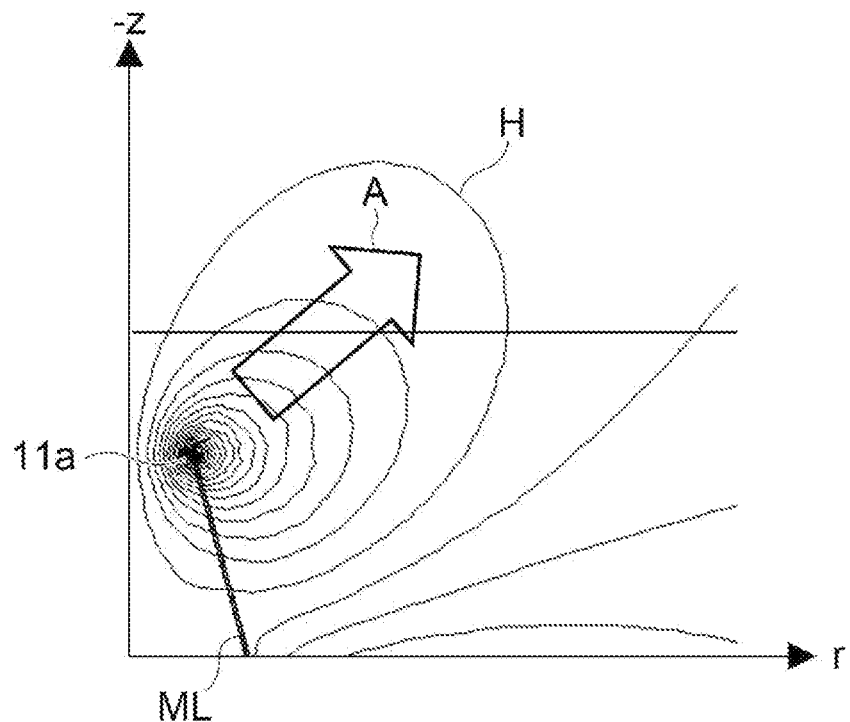
FIG. 20 is a conceptual diagram showing magnetic force lines of a leakage magnetic field generated from a first end portion of the magnetic member according to the second embodiment shown in FIG. 16.

FIG. 18 is a perspective view of a magnetic member according to comparative example. FIG. 19 is a diagram showing magnetic force lines of a leakage magnetic field generated from a first end portion 11a of the magnetic member ML shown in FIG. 18. FIG. 20 is a conceptual diagram showing magnetic force lines of a leakage magnetic field generated from a first end portion 11a of the magnetic member ML according to the second embodiment shown in FIG. 15.

When FIGS. 19 and 20 are compared, as indicated by the arrow A, the magnetic force lines of the magnetic member ML of the second embodiment are directed to the upper side (i.e., the −z direction) as compared with those of the comparative example. Since the magnetic force line of the magnetic member ML is directed upward with respect to that of the comparative example, the component Hr of the leakage magnetic field is attenuated faster than that of the comparative example as the distance r increases. As a result, the influence of the leakage magnetic field on the adjacent magnetic members ML is smaller in the second embodiment than in the comparative example. As a result, in the second embodiment, it is possible to reduce the interference between adjacent cells.

Third Embodiment

Figure 21:
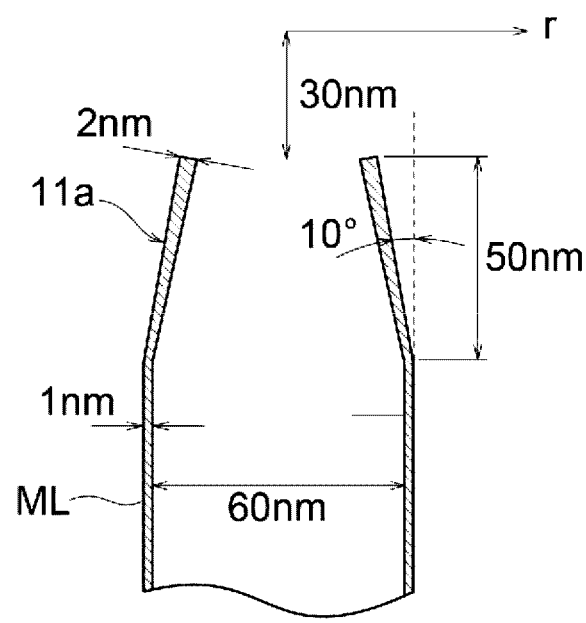
FIG. 21 is a cross-sectional view of a magnetic member of a magnetic memory according to a third embodiment.

FIG. 21 is a cross-sectional view of a magnetic member ML of a magnetic memory according to a third embodiment. The third embodiment is the same as the second embodiment in that the first end portion 11a of the magnetic member ML is inclined toward the inside of the magnetic member ML with respect to the extension direction (i.e., the −z direction) of the magnetic member ML. However, according to the third embodiment, the film thickness of the first end portion 11a of the magnetic member ML is greater than that of the other portion on the second end portion 11b side of the magnetic member ML. In addition, the thickness of the magnetic member ML is increased toward the end surface of the first end portion 11a in the inclined portion toward the inside of the magnetic member ML. For example, the film thickness of the magnetic member ML is 1 nm in a portion other than the first end portion 11a, is increased toward the end surface of the first end portion 11a, and is 2 nm on the end surface of the first end portion 11a. Other configurations of the third embodiment may be the same as the corresponding configurations of the second embodiment.

Figure 22:
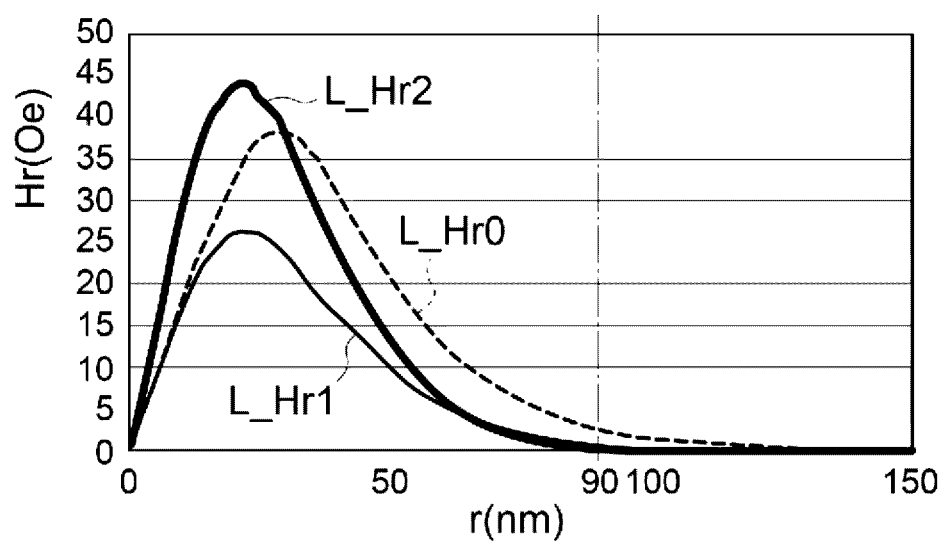
FIG. 22 is a graph showing a component of a leakage magnetic field in x-y plane and a distance from a central axis of the magnetic member.

FIG. 22 is a graph showing a simulation result of a component Hr of a leakage magnetic field in the x-y plane and a distance r from a central axis of the magnetic member. The horizontal axis of the graph indicates the distance r from the central axis of the magnetic member ML. The vertical axis indicates the magnitude of the component Hr of the leakage magnetic field in the x-y plane. In this simulation, the distance Zmtj from the first end portion 11a of the magnetic member ML to the MTJ element 14 is set to about 30 nm. In addition, the vertical axis is not normalized and represents the magnitude of the magnetic field of each of the lines L_Hr0 to L_Hr2. A simulation was performed on the magnetic member ML as a perpendicular magnetization film having a saturation magnetization (Ms) of 1000 emu/cc.

As a comparative example, the line L_Hr0 indicates the component Hr of the leakage magnetic field of the magnetic member ML in which the first end portion 11a is not inclined (see FIG. 18). The line L_Hr1 indicates the component Hr of the leakage magnetic field of the magnetic member ML in which the first end portion 11a according to the second embodiment is inclined (see FIG. 15). That is, the lines L_Hr0 and L_Hr1 correspond to the lines L_Hr0 and L_Hr1 shown in FIG. 17, respectively. The line L_Hr2 indicates the component Hr of the leakage magnetic field of the magnetic member ML in which the first end portion 11a according to the third embodiment is inclined and thickened (see FIG. 21).

All the lines L_Hr0 to L_Hr2 have the maximum value (i.e., the peak) as the distance r increases, and then attenuate. However, as the distance r increases, the lines L_Hr1 and L_Hr2 attenuate faster than the line L_Hr0.

The maximum value of the line L_Hr1 is smaller than that of the line L_Hr0. That is, the component Hr of the leakage magnetic field corresponding to the line L_Hr1 is smaller than the component Hr of the leakage magnetic field corresponding to the line L_Hr0. Meanwhile, the maximum value of the line L_Hr2 is larger than those of the lines L_Hr0 and L_Hr1. That is, the component Hr of the leakage magnetic field corresponding to the line L_Hr2 is larger than the component Hr of the leakage magnetic field corresponding to the lines L_Hr0 and L_Hr1, but is attenuated faster as the distance r increases.

As described above, in the third embodiment, the component Hr of the leakage magnetic field can be increased by increasing the film thickness of the first end portion 11a of the magnetic member ML. In addition, by inclining the first end portion 11a of the magnetic member ML, the component Hr of the leakage magnetic field can be attenuated quickly according to the distance r from the central axis of the magnetic member ML. That is, according to the third embodiment, when the first end portion 11a is inclined and the film thickness thereof is increased, the component Hr of the leakage magnetic field of the magnetic member ML has a large peak and attenuates faster as the distance r increases. As a result, the magnetic member ML according to the third embodiment can apply a large leakage magnetic field to the MTJ element 14 and can reduce the interference between adjacent cells.

The magnetic member ML according to the third embodiment can be formed using a plasma chemical vapor deposition (CVD) method. For example, when the process gas flows from the first end portion 11a side in the film formation process of the magnetic member ML, the film formation reaction is enhanced at the first end portion 11a by applying the plasma near the first end portion 11a. Accordingly, the first end portion 11a of the magnetic member ML can be formed to be thicker than other portions.

In addition, when the process gas flows from the second end portion 11b side in the film formation process of the magnetic member ML, the concentration of the process gas is increased in the vicinity of the first end portion 11a by narrowing the opening of the magnetic member ML on the first end portion 11a side. Accordingly, the first end portion 11a of the magnetic member ML can be formed to be thicker than other portions. As described above, the magnetic member ML according to the third embodiment may be formed.

As described above, according to the third embodiment, the magnetic member ML can apply a large leakage magnetic field to the MTJ element 14 and can reduce the interference between adjacent cells by inclining the first end portion 11a and increasing the film thickness thereof. As a result, the reduction of the interference between adjacent cells leads to the prevention of the read error of data.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic memory comprising:
   a plurality of cylindrical magnetic members each extending along a first direction and having a first end portion and a second end portion; and
   a magnetoresistive element that includes:
      a magnetization variable layer with a variable magnetization direction,
      a magnetization fixed layer with a fixed magnetization direction, and
      a non-magnetic layer between the magnetization variable layer and the magnetization fixed layer, wherein
   when viewed in the first direction, the magnetoresistive element overlaps a part of the first end portion of one of the magnetic members, and the magnetization direction of the magnetization variable layer intersects with the magnetization direction of the magnetization fixed layer at an angle larger than 0 degrees and smaller than 180 degrees.

2. The magnetic memory according to claim 1, further comprising:
   a first wiring and a second wiring that are provided adjacent to the second end portion of one of the magnetic members, are disposed apart from said one of the magnetic members, extend along a second direction intersecting the first direction, and are disposed adjacent to each other in a third direction intersecting the first and second directions, wherein when viewed in the first direction, at least a part of said one of the magnetic members is between the first and second wirings.

3. The magnetic memory according to claim 1, wherein the magnetization direction of the magnetization fixed layer is normal to an outer periphery portion of said one of the magnetic members that overlaps the magnetoresistive element when viewed in the first direction.

4. The magnetic memory according to claim 3, wherein the magnetization direction of the magnetization variable layer is inclined from a direction that is tangent to the outer periphery portion of said one of the magnetic members.

5. The magnetic memory according to claim 1, wherein, when a radius of the first end portion of each of the magnetic members is $r_{MML}$, a center of gravity of the magnetoresistive element is within a range of $\pm r_{MML}/5$ from an outer periphery portion of said one of the magnetic members that overlaps the magnetoresistive element when viewed in the first direction, in a direction normal to the outer periphery portion.

6. The magnetic memory according to claim 1, wherein a longitudinal direction of the magnetoresistive element is different from the magnetization direction of the magnetization fixed layer.

7. The magnetic memory according to claim 1, wherein, when viewed in the first direction, a longitudinal direction of the magnetoresistive element is a direction tangent to an outer periphery portion of said one of the magnetic members that overlaps the magnetoresistive element.

8. The magnetic memory according to claim 1, wherein the first end portion of each of the magnetic members is inclined towards an inside of the magnetic member with respect to an extension direction of the magnetic member.

9. The magnetic memory according to claim 8, wherein a thickness of the first end portion of each of the magnetic members is greater than a thickness of the second end portion of said each of the magnetic members.

10. The magnetic memory according to claim 1, further comprising:
a first wiring and a second wiring that are provided adjacent to the second end portion of one of the magnetic members, extend along a second direction intersecting the first direction, and are disposed adjacent to each other in a third direction intersecting the first direction and the second direction; and
a third wiring extending along the third direction and electrically connected to the magnetoresistive element.

11. A magnetic memory comprising:
a plurality of cylindrical magnetic members each extending along a first direction and having a first end portion and a second end portion; and
a magnetoresistive element that includes:
a magnetization variable layer with a variable magnetization direction,
a magnetization fixed layer with a fixed magnetization direction, and
a non-magnetic layer between the magnetization variable layer and the magnetization fixed layer, wherein
the magnetoresistive element overlaps a part of the first end portion of one of the magnetic members when viewed in the first direction, and
when viewed in the first direction, a longitudinal direction of the magnetoresistive element is different from the magnetization direction of the magnetization fixed layer.

12. The magnetic memory according to claim 11, further comprising:
a first wiring and a second wiring that are provided adjacent to the second end portion of one of the magnetic members, are disposed apart from said one of the magnetic members, extend along a second direction intersecting the first direction, and are disposed adjacent to each other in a third direction intersecting the first and second directions, wherein
when viewed in the first direction, at least a part of said one of the magnetic members is between the first and second wirings.

13. The magnetic memory according to claim 11, wherein the longitudinal direction of the magnetoresistive element is a direction tangent to an outer periphery portion of said one of the magnetic members that overlaps the magnetoresistive element when viewed in the first direction.

14. The magnetic memory according to claim 13, wherein the magnetization direction of the magnetization fixed layer is a direction normal to the outer periphery portion.

15. The magnetic memory according to claim 13, wherein the magnetization direction of the magnetization variable layer is inclined from the direction tangent to the outer periphery portion.

16. The magnetic memory according to claim 11, wherein, when a radius of the first end portion of each of the magnetic members is $r_{MML}$, a center of gravity of the magnetoresistive element is within a range of $\pm r_{MML}/5$ from an outer periphery portion of said one of the magnetic members that overlaps the magnetoresistive element when viewed in the first direction, in a normal direction of the outer periphery portion.

17. The magnetic memory according to claim 11, wherein the first end portion of each of the magnetic members is inclined towards an inside of the magnetic member with respect to an extension direction of the magnetic member.

18. The magnetic memory according to claim 17, wherein a thickness of the first end portion of each of the magnetic members is greater than a thickness of the second end portion of said each of the magnetic members.

19. The magnetic memory according to claim 11, further comprising:
a first wiring and a second wiring that are provided adjacent to the second end portion of one of the magnetic members, extend along a second direction intersecting the first direction, and are disposed adjacent to each other in a third direction intersecting the first direction and the second direction; and
a third wiring extending along the third direction and electrically connected to the magnetoresistive element.

20. A magnetic memory comprising:
a cylindrical magnetic member extending along a first direction; and
a magnetoresistive element that includes:
a magnetization variable layer with a variable magnetization direction,
a magnetization fixed layer with a fixed magnetization direction, and
a non-magnetic layer between the magnetization variable layer and the magnetization fixed layer, wherein
the magnetoresistive element overlaps a part of an end portion of the magnetic member when viewed in the first direction, and
when viewed in the first direction, the magnetization direction of the magnetization variable layer intersects with the magnetization direction of the magnetization fixed layer at an angle larger than 0 degrees and smaller than 180 degrees.

* * * * *